Sept. 16, 1969　B. BRONIEWSKI ET AL　3,467,024
AIR-CUSHION SUPPORTED, HIGH-SPEED VEHICLE FOR
OPERATION ON A SUPPORT AND GUIDE TRACK
Filed Feb. 21, 1967　3 Sheets-Sheet 1

BODHAN BRONIEWSKI &
BERNARD WARSZAWSKI,
Inventors 3,467,024
AIR-CUSHION SUPPORTED, HIGH-SPEED VEHICLE FOR OPERATION ON A SUPPORT AND GUIDE TRACK
Bodhan Broniewski, Vaucresson, and Bernard Warszawski, Paris, France, assignors to Societe Generale de Constructions Electriques et Mecaniques (ALSTHOM), Paris, France, a corporation of France
Filed Feb. 21, 1967, Ser. No. 617,657
Claims priority, application France, Feb. 28, 1966, 2,673
Int. Cl. B60v 3/04; B61d 15/00; B61b 13/08
U.S. Cl. 104—134                                    12 Claims

ABSTRACT OF THE DISCLOSURE

The underside of a high-speed air-cushion supported vehicle is provided with an undersurface having grooves formed therein converging in V-direction towards the rear of the vehicle, to scoop air from the outside into the grooves, and for escape beneath the vehicle, to thus support the vehicle as it moves over the support and guide track.

---

The present invention relates to vehicles supported by means of an air cushion on a support surface, so that, in operation, they float over the surface without mechanical weight, supporting members.

In known air-cushion supported vehicles, it has been customary to provide a compressor unit, and discharge nozzles directing compressed air beneath the vehicle and against a support surface. The power consumption, and discharge capacity of such a compressor depends on the amount of air discharge necessary, as well as on the amount of escape of air, and leakage losses, towards the exterior from beneath the vehicle. When vehicles are designed for operation at high speed, the leakage losses become rather substantial. The vehicle deviates from an exact, ideal and low-loss position over the surface due to the inevitable pitch, yaw, and roll of the vehicle during motion, as well as due to outside influences, such as sudden gusts of wind and the like. It is thus necessary to provide a powerful compressor unit, which is heavy and requires a large amount of space. Since such a compressor unit, and its auxiliary structural units likewise have to be supported, the pressure to lift the vehicle has to be further increased to lift the weight of the compressor unit, thus further adding to the power requirements of the compressor. Entirely apart from the power requirements, such units are noisy and the increased amount of air which escapes from the sides is objectionable.

It is an object of the present invention to provide an air-supported vehicle avoiding the aforementioned disadvantages.

Subject matter of the invention

The vehicle, in accordance with the present invention, is formed with a bottom surface to face against a support track or support surface, which has formed therein grooves extending in V-direction towards the rear of the vehicle (when viewed in plan). The end points of the V are open to the atmosphere and act as air scoops as the vehicle moves, the air escaping from the V beneath the vehicle and against the support surface.

Atmospheric air, present at the lateral edges of the surface, is thus dynamically pumped into the grooves to form a cushion of free air between the bottom surface of the vehicle and the facing surface of the support track.

In contrast to known apparatus, in which air is introduced in the center of the surface facing the support, and escapes towards the outside, over an escape space, or crack, between the vehicle and the support surface, which has low air resistance, the present invention contemplates pumping the air from the outside, that is from the lateral sides of the vehicle, towards a region intermediate the sides, so that the escape path for the air will present a high resistance to lateral air movement.

The grooves, in accordance with the present invention, are preferably arranged in a V formation; these grooves may have further grooves extending therefrom, in groups, like branchings of a tree; and further, sub-groups may extend from the first sub-groupings. The cross-sectional area of the grooves in the sub-groups can decrease progressively, as the sub-groups continue to branch out. The first group of grooves, in general V shape with respect to the lengthwise dimension of the vehicle (with respect to its intended direction of travel) are sharply inclined. The next sub-group, branching off from the inclined legs of the V can then be essentially parallel to the lengthwise dimension of the vehicle; and from that group of essentially longitudinal grooves, another set of grooves may branch out again essentially parallel to each other and also essentially parallel to the legs of the V. An arrangement in which the various grooves of any one sub-group are essentially parallel to each other provides for maximum utilization of space.

Branching out of successive arrays of groups permits utilization of resistance to lateral escape of air from the grooves of less cross section, and thus improved utilization of the effect of dynamic pressure obtained from the grooves of larger depth and cross section. Loss of air, laterally, is effectively inhibited by matching the depth of the grooves of the various sub-groups to the depth of the group to which they connect, and then tapering them to become more and more shallow.

The grooves of any one of the arrays, or branch groups, preferably are of decreasing size towards their terminal ends, decreasing in width, in depth, or in both width and depth dimension. Preferably, the first, or main V-shaped grooves (in plan view) decrease gradually in depth; whereas the grooves of the branch group have the same depth as the first V-shaped grooves at their junction points therewith, and then decrease in width; and the grooves of subsequent sub-groups decrease in depth, and so forth, alternating decrease in width and depth.

The opening of the V-shaped grooves extending towards the outside lateral surfaces of the vehicle may be extended or enlarged, in order to form air scoops.

The air space between the surface of the vehicle facing the support and guide track should be as small as possible in order to limit the escape and leakage of air. A certain amount of clearance, is, however, necessary in order to accommodate roll, yaw, and pitch of the vehicle, to accommodate possible obstacles or pebbles and other projections on the track or the like. The space between the surface of the vehicle and the support track can be further reduced if the facing of the surface is formed as a soft pneumatic cushion which can be foam material or which may be inflatable. The outside of the cushion is then formed with the grooves in the shape previously discussed.

The vehicle will thus be supported over the ground by an air support of substantial thickness which is formed of two parts:

(1) A thick layer of air within a pneumatic cushion, which is capable of absorbing shocks due to excessive departure of the vehicle from its intended position; and (2) A thin cushion of free air, created by movement of the vehicle, and stabilized by the shape of the grooves creating the air cushion, and assuring separation of the vehicle from the support and guide surfaces of the track.

The structure, organization and operation of the invention will now be described more specifically in the following detailed description with reference to the accompanying drawings, in which.

Figure 1:
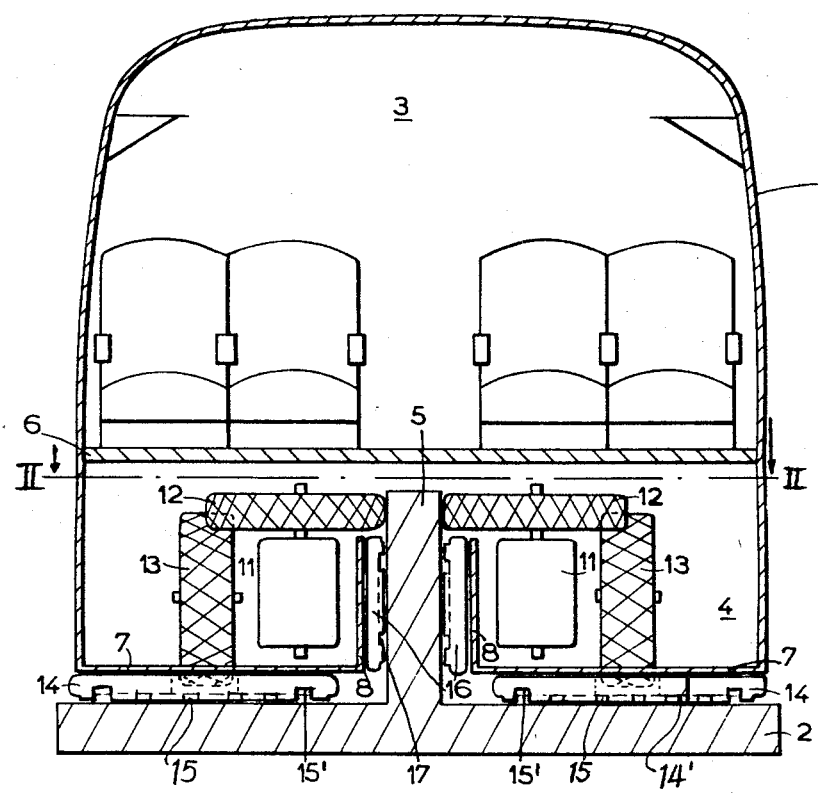
FIG. 1 is a vertical sectional view, partly schematic, of a vehicle on a guide and support track.

Referring now to the drawings, and in particular to FIG. 1: The vehicle is formed in general with a housing 1, adapted to travel over a track 2, in form of an inverted T. A top portion within the housing 3 forms a passenger compartment; a bottom portion 4 is formed to leave a central free space to encompass the vertical or guide portion 5 of the track 2. The passenger compartment is separated from the drive compartment by a flooring 6; the bottom of the housing 1 is formed with flat closure surfaces 7 and a pair of vertical inturned plates 8, parallel to the guide portion 5 of the track.

Figure 2:
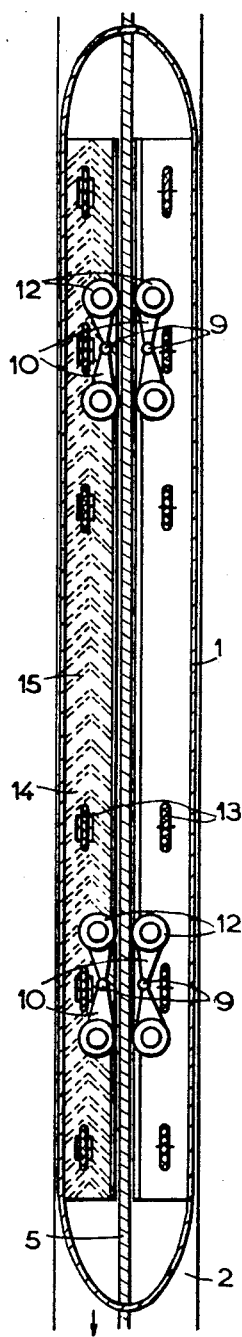
FIG. 2 is a top view along line II—II of FIG. 1, at a reduced scale.

Carrier brackets, or bogies 10 (FIG. 2) support an electric motor 11 (FIG. 1) in a vertical axis, driving pneumatically tired wheels 12, and turning in bearings 9 (FIG. 2). Locking devices, not shown and preferably resilient, assure that the guide member 5 of the track is securely held by the drive wheels 12.

Retractable, vertical wheels 12 support the vehicle when it is standing still, or when it is moving at low speed, or in reverse, or when ground contact support is desired. At higher speeds, however, the vehicle is supported by an air cushion.

To provide an air cushion, the lower surface 7, of the vehicle shell 1, is provided throughout its length with a pneumatic cushion 14, which may be partitioned off interiorly as seen, schematically, at 14'; only one such partition is shown for clarity of the drawing, it being understood that any suitable partitioning can be used. The surface of the cushion 14 facing the top surface of track 2 is relief-molded to form grooves 15, in the form of inter-laced V's, with the point directed towards the rear of the vehicle in the direction of intended motion, as best seen in FIG. 2. The pneumatic cushion 14 may be formed of a single piece, or several superimposed layers; the thickness thereof may vary from about four inches to a foot or more; the cushion itself may consist of a cellular material, having air cells, such as sponge or foam rubber, expanded or foamed plastic or the like; the interstices, or pores of the material may be in the size of 1 mm. up to the centimeter range. It can be secured to the bottom of the vehicle by adhesion, by clips, staples, by interlocking tongues in grooves, and the like. The particular form of connection of the cushion of the vehicle itself is not critical.

The grooves 15 in the surface facing the top surface of the track establish the air pressure which lifts the vehicle as it moves. The air pressure thus created forms an air cushion, which increases rapidly as a function of vehicle speed and progressively lifts the vehicle so that the support wheels 13 will no longer have any connection with the ground at all. Since the free air cushion should be very small, however, it is preferred that the solid vehicle support wheels 13 are suspended by means of a retractable suspension mechanism. Such retractable suspension mechanisms are known and need not be described further; the retraction of the wheels preferably is controlled by the speed of the vehicle in such a manner that when a certain given intermediate speed is reached, they retract automatically. The mechanism should be so arranged that upon decrease of speed, or sudden braking or stopping, the wheels automatically drop.

The cushion 14 may also be formed as an inflatable cushion, inflated by means of a pressure source (not shown) with an automatic pressure regulator, increasing the pressure, and thus the size of the cushion 14, upon increase in speed to increase the distance between permanently mounted wheels 13 and the bottom surface of cushion 14 until the pressure beneath the vehicle and track 2, and the weight of the vehicle are in equilibrium. The pressure beneath the vehicle, of course, will be a function of air scooped into the grooves 15 and escaping laterally from beneath the vehicle. The position which the vehicle will reach, above the track, will be stable. Any increase in entrapped air causes an increase in pressure beneath the vehicle, a slight lifting, and this again increases the escape or leakage of air sideways.

The lateral support of the vehicle and guidance with respect to yaw and roll, as well as resistance against gusts of wind, is provided by air guides formed by grooves 17 in vertically arranged air cushions 16 applied to internal vertical sides 8 (FIG. 1). Again, similar to the cushions 14, the grooves 17 converge in V-shape, pointed towards the rear of the vehicle, and capable of scooping air from the internal corners between the horizontal support portion, and the vertical guide portion of the track 2, and the free space beneath wheels 12. Lateral guidance is thus assured even at high speeds by the air cushion 16 and the grooves formed therein. If other means of propulsion than wheels 12 are used, these wheels may also be removed from contact with the central guide portion and guidance be obtained entirely by the cushion of free air beneath air cushion 16 and central guide portion 5 of the track.

Figure 3:
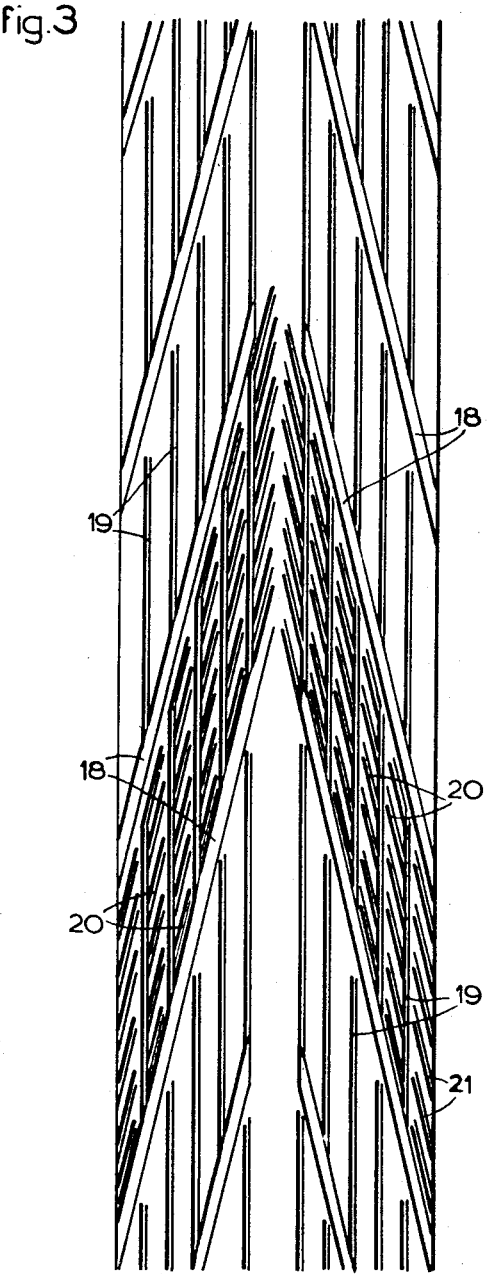
FIG. 3 is a partial bottom view of the support surface of the vehicle in accordance with the present invention.

FIG. 3 illustrates an arrangement of grooves which has been found to be advantageous. The grooves themselves are subdivided into successively branching groups or arrays 18, 19, 20, each one of them formed of grooves by and in themselves parallel. The grooves of array 18 are similar to grooves 15, FIGS. 1 and 2; they may be of substantial size, for example in the order of four inches or more, and extending in V-direction towards the center of any one of the surfaces beneath the corresponding section of the support track. The angle may be comparatively small, several degrees to several tens of degrees, for example, with respect to the longitudinal axis of the vehicle. Array 18 is connected with an array 19, formed of grooves of less extensive size, and parallel to the longitudinal axis of the vehicle. Each one of the grooves of array, or group 19, further branches into an array or group 20, of small size, for example one-quarter inch and less. The grooves of array 20 themselves are parallel to the grooves of array 18. The depth of the groove is approximately of the same order as its width, and the spacing between grooves may again be about the same as the width of the grooves themselves. The number of sub-divisions or branchings or arrays is determined by the width of the vehicle; two, or three or more sub-divisions in accordance with the system explained in connection with FIG. 3 can be used. The depth of the grooves of any one array is preferably the same as the depth of the groove of the array to which it is connected; and the cross-sectional area of the grooves of the arrays preferably decreases as they extend deeper away from their junction with air being supplied thereto. Either the depth, or the width, preferably alternately, can change.

Only three arrays of grooves are shown in FIG. 3, in order to simplify the drawings. The lateral outside surface facing the track is preferably formed with grooves 21, similar to the grooves of the array 20 in order to supply air directly to the entire surface beneath the vehicle and to utilize all available space efficiently.

In order to simplify the drawings, the decrease in width of the grooves is not specifically shown; grooves 15 (outside and inside of FIG. 1) illustrate the greater depth of the grooves at that point, in an exaggerated and enlarged scale.

We claim:

1. In a vehicle adapted to operate on a guide and support track, said vehicle having a surface facing said track and extending lengthwise thereof and having outer sides, an air cushion interposed between said vehicle and said track; the improvement wherein said surface facing said track is formed with grooves (15) beginning at outer sides of said vehicle and extending from said outer sides inwardly beneath said vehicle and being rearwardly inclined with respect to the length of said vehicle and with respect to the intended direction of travel of said vehicle whereby, upon movement of said vehicle, over said support track, air will be scooped up by said grooves to form a supporting air cushion beneath said vehicle.

2. Vehicle as claimed in claim 1 wherein said grooves are arranged in a plurality of inter-connected subordinate branching groups (18, 19, 20), the grooves of any one corresponding branch group being parallel to each other.

3. Vehicle as claimed in claim 2 wherein said branch groups form a first array (19) extending from said first grooves (15, 18) in a direction essentially parallel to the major dimension of said vehicle and rearwardly from said first grooves (15, 18);

and second branch groups forming a second array (20) extending from the grooves of said first array (19), the grooves of said second array extending essentially parallel to said first grooves (15, 18).

4. Vehicle as claimed in claim 3 wherein the grooves of successive subordinate arrays have progressively smaller dimension.

5. Vehicle as claimed in claim 1 including a pneumatic cushion secured to the under-surface of said vehicle, the underside of said cushion forming said surface of said vehicle, said pneumatic cushion having said grooves formed therein.

6. Vehicle as claimed in claim 5 wherein said cushion is an inflatable hollow subdivided cushion.

7. Vehicle as claimed in claim 5 wherein said cushion is of spongy cellular resilient material.

8. Vehicle as claimed in claim 1 wherein the beginning point of said grooves is enlarged to form air scoops.

9. Vehicle as claimed in claim 1 wherein the dimension of said grooves decreases progressively towards the interior of said vehicle.

10. Vehicle as claimed in claim 1 wherein a pair of parallel arranged arrays of grooves are provided, each formed in V-shape, in plan view, the outer legs of said V terminating at the outer sides of said vehicle and the inner legs of said V terminating near the center line of said vehicle.

11. Vehicle as claimed in claim 10, said vehicle being adapted to travel over a support track having a flat surface and a central upstanding guide surface extending essentially perpendicular to said flat surface, wherein the outer terminations of said pair of parallel V-shaped grooves are arranged parallel to each other and on either side of said central guide surface.

12. Vehicle as claimed in claim 10, said vehicle being formed with guide surfaces extending essentially parallel to said upstanding track guide surface (5); said vehicle guide surfaces having grooves formed therein, converging towards each other in essentially V-shape, with the apex of the V directed rearwardly in the direction of intended motion of the vehicle, said grooves facing said upstanding track guide.

References Cited

UNITED STATES PATENTS

| | | |
|---|---|---|
| 2,864,318 | 12/1958 | Toulmin. |
| 3,096,728 | 7/1963 | Amann et al. _____ 104—134 |
| 3,330,221 | 7/1967 | Trillo _____ 104—134 |
| 3,369,497 | 2/1968 | Driver et al. |

FOREIGN PATENTS 966,602  3/1950  France.

ARTHUR L. LA POINT, Primary Examiner

RICHARD A. BERTSCH, Assistant Examiner

U.S. Cl. X.R.

104—23, 155